United States Patent [19]

Stout

[11] Patent Number: 5,062,927

[45] Date of Patent: Nov. 5, 1991

[54] METHOD OF OPERATING A STILL

[75] Inventor: Timothy R. Stout, Placerville, Calif.

[73] Assignee: T and G Technologies, Inc., Placerville, Calif.

[21] Appl. No.: 461,246

[22] Filed: Jan. 5, 1990

[51] Int. Cl.⁵ .................. B01D 1/22; B01D 3/28; B01D 61/00

[52] U.S. Cl. .................. 203/89; 159/13.1; 159/48.2; 159/49; 159/DIG. 27; 159/DIG. 28; 165/110; 165/111; 202/185.1; 202/236; 203/90; 210/321.84; 210/500.36; 210/640

[58] Field of Search .................. 203/25, 27, 86, 89, 203/90; 159/13.1, 13.3, 48.2, 49, DIG. 27, DIG. 28, DIG. 33, 23, DIG. 32; 202/236, 267.1, 185.1, 182, 202, 235; 165/110, 111; 210/640, 500.36, 321.84

[56] References Cited

U.S. PATENT DOCUMENTS

| | | | |
|---|---|---|---|
| 2,447,746 | 8/1948 | Ferris et al. | 203/89 |
| 2,530,376 | 11/1950 | Castle et al. | 202/187 |
| 3,161,574 | 12/1964 | Elam | 202/236 |
| 3,206,381 | 9/1965 | Neugebauer | 203/86 |
| 3,227,630 | 1/1966 | Beckman | 202/205 |
| 3,282,797 | 11/1966 | Hammer | 202/236 |
| 3,385,770 | 5/1968 | Roe et al. | 202/236 |
| 3,930,958 | 1/1976 | Maruichi | 159/18 |
| 4,119,485 | 10/1978 | Erwin | 159/28.3 |
| 4,160,726 | 7/1979 | Del Pico | 210/651 |
| 4,340,480 | 7/1982 | Pall et al. | 210/500.21 |
| 4,402,793 | 9/1983 | Petrek et al. | 202/174 |
| 4,515,210 | 5/1985 | Smith et al. | 261/112.1 |
| 4,578,093 | 3/1986 | Cheng et al. | 62/12 |
| 4,585,523 | 4/1986 | Giddings | 202/236 |
| 4,911,233 | 3/1990 | Chao et al. | 165/111 |

FOREIGN PATENT DOCUMENTS 0033447 3/1978 Japan .................. 165/110

Primary Examiner—Virginia Manoharan
Attorney, Agent, or Firm—A. C. Smith

[57] ABSTRACT

The method of preparing and operating a heat-exchanging membrane of plastic material as the evaporating and condensing surfaces in a still includes treating the evaporating surface to be wettable by the distilland, and includes selectively washing the condensing surface which is unwettable by the by the distilland in order to promote efficient accumulation of condensed droplets and efficient heat transfer through the membrane to the evaporation surface. Washing liquids of either similar or disimilar chemical composition relative to the condensed vapor are recycled to the upper region of the condensing surface to facilitate washing of the surface by the downward movement of accumulated droplets of condensed vapor.

7 Claims, 12 Drawing Sheets

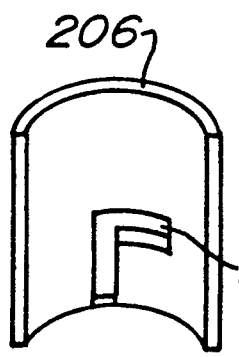
Figure 11
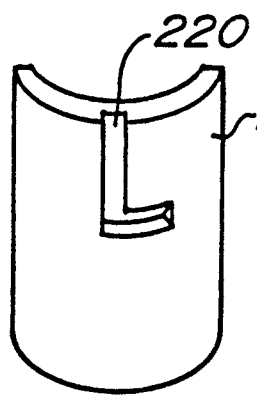
Figure 12
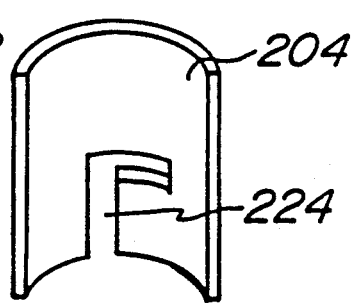
Figure 13
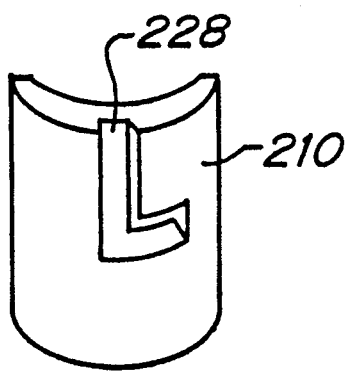
Figure 14
| FIG. 20A |
| FIG. 20B |
Figure 20

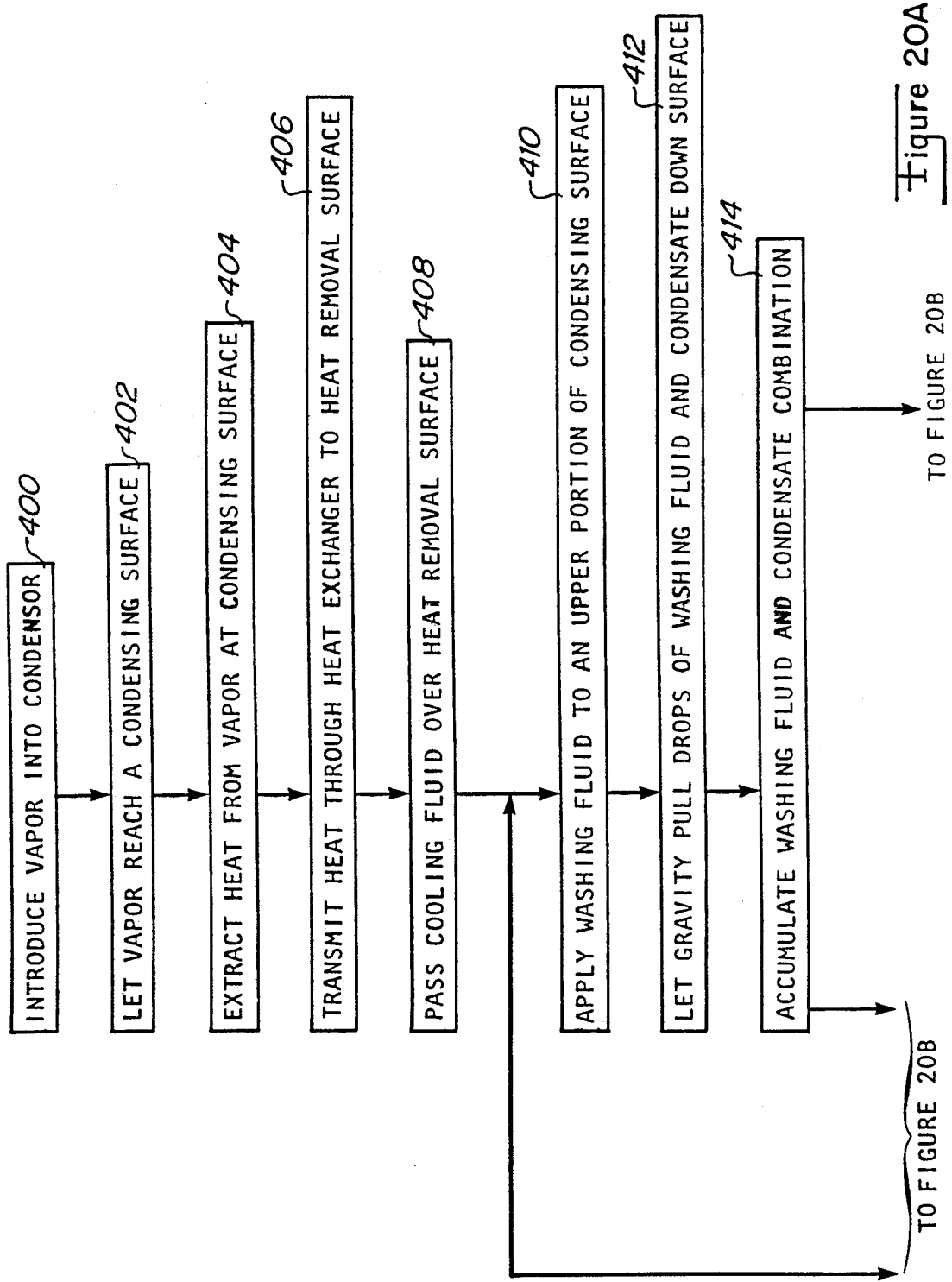

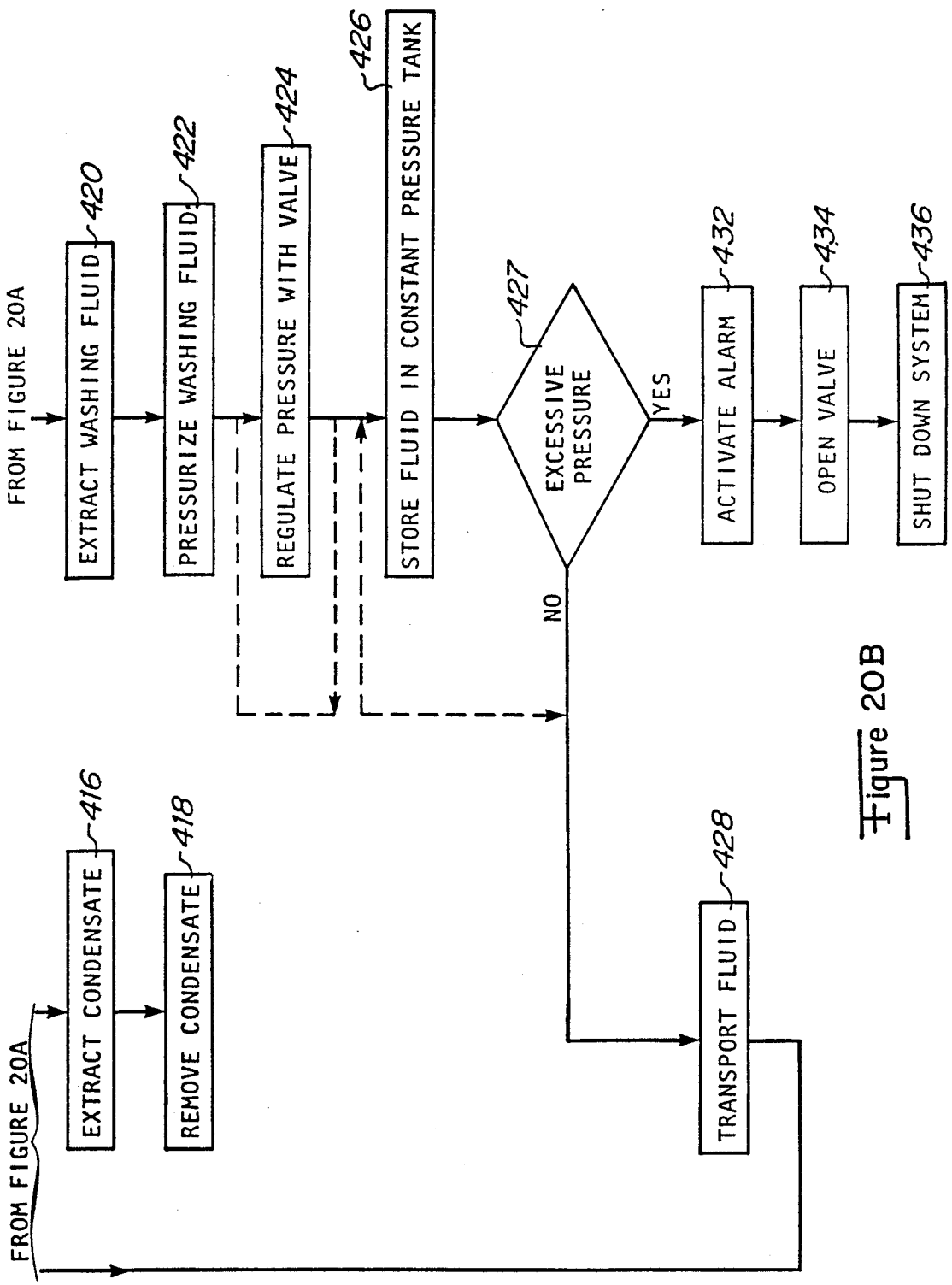

METHOD OF OPERATING A STILL

BACKGROUND OF THE INVENTION

Field of the Invention

This invention relates to an improved still suitable for purifying brackish water. More particularly, this invention relates to a plastic heat exchange membrane and method for transferring heat from a condensing vapor on a non-wettable surface on one face of the membrane to a wettable evaporating surface on the opposing face of the membrane. The evaporating surface of the membrane may be made wettable by the application of a corona discharge to the surface, or by the application of a wettable coating to the surface.

Plastic heat exchange membranes to be used in vapor compression and multi-effect stills are known in the art. Water vapor as well as other vapors with polarized molecules tend to condense on plastic films which feature unpolarized molecules and are thereby inherently unwettable, and the water vapor condenses in dropwise manner instead of in film-wise manner. The primary advantage of drop-wise flow is that when the condensate flows down the surface of the plastic, it leaves behind a 'dry' surface which features a significantly higher heat exchange to a condensing vapor than a wetted surface, as described in the prior art.

An unwettable surface has the disadvantage that, on the evaporation side of a heat exchanger, a thin film of distilland is not readily attainable on the evaporation surface due to the distilland 'beading' on the surface and leaving 'dry' areas on the evaporation surface. Since the dry areas do not take part in the evaporation process this significantly decreases the effectiveness of the evaporator. Certain known evaporators use various screens, meshes, and wicks in an attempt to force the distilland to spread in a controlled manner over the evaporating surface.

Water distillation cycles are based on the interaction of three principles: 1. It takes approximately 1,000 b.t.u.s. of heat to evaporate one pound of water, and such quantities of heat are too expensive to allow direct, single-stage evaporation to be used in plants having large output. Besides, the vapor has the latent heat absorbed by its molecules which must be given up in order for the vapor to condense. 2. The saturation pressure of water vapor varies greatly with small changes in water temperature. Saturation pressure is the absolute pressure of a quantity of vapor which is at its boiling/condensation temperature with no other vapors present. Steam tables are readily available which document this relationship. 3. The saturation pressure of water at a given temperature is reduced if salts are dissolved in the water. For normal sea water, the reduction in saturation pressure is about 1.84%. Thus, pure water at 212 degrees Fahrenheit has a saturation pressure of 14.7 pounds per square inch. However, sea water at the same temperature will have a saturation pressure 1.84% below this, or only 14.4 pounds per square inch. Thus, if a chamber contains sea water and water vapor the space above the sea water, and if the water is 212 degrees Fahrenheit, then the vapor, if it is in equilibrium with the sea water, will be at 14.4 pounds per square inch absolute (psia) pressure instead of the 14.7 pounds per square inch as would be produced with pure water. Conversely, if it is desired to have the vapor at 14.7 psia, the sea water temperature must be increased to 213.03 degrees Fahrenheit, which is higher by 1.03 Fahrenheit degrees than is needed to maintain the same pressure with pure water. These distillation cycles require all non-condensible gasses to be removed from process equipment and from the supply brine in order to work efficiently. Hence, distillation processes normally take place under pressure or in a vacuum, but rarely at ambient atmospheric pressure.

A simple distillation cycle may include a number of stages that are thermally connected in series, with a hot source at one end and a cold source at the other end of the series. Each stage has its own supply of brine, which flows over an evaporator. Each stage also has a condensor which is in heat-exchange relationship with the evaporator of the adjacent, lower temperature stage. The temperature difference between each stage is approximately equal to the total number of stages divided by the difference in temperatures of the hot source and the cold source at opposite ends of the series of stages. The operation and the thermal flow may be described as follows: In the first stage the hot source heats the evaporator in that stage which, in turn, vaporizes some of the brine flowing across the evaporator. The vapor is then condensed at the condensor for the stage, and as the vapor condenses, its latent heat energy is transferred to the condensor and then to the evaporator of the next stage which, in turn, vaporizes a portion of the brine flowing across its surface. This procedure is repeated for each stage until, at the last stage, the heat from the condensor is transferred into the cold source. The advantage of a multiple-stage still is that the water produced from evaporating the brine in the first stage is increased by all of that produced from the additional stages without any significant additional increase in energy.

A vapor compression cycle may include a single stage evaporator to vaporize the brine within an evaporation chamber, a single stage condensor to condense vapor in a condensation chamber, and a vapor compressor to raise the pressure and therefore the temperature of the vapor as the vapor passes from the evaporation chamber into the condensation chamber by operation of the compressor. The condensor and evaporator are in heat-exchange relationship with each other, such that heat can flow from the condensor to the evaporator. In operation, incoming brine flows over the evaporator and a portion of the brine is evaporated. The vapor from the brine is supplied to the compressor where its pressure and temperature are increased, and from which it is then exhausted into the condensation chamber. The increase in pressure should be sufficient to assure that the saturation temperature of the compressed vapor is higher than the boiling point temperature of the distilland flowing over the evaporator, and is sufficiently higher to provide an acceptable rate of heat flow from the condensor to the evaporator. The advantage of the vapor-compression cycle is that most of the heat required to evaporate the brine is supplied by the condensation of the vapor, thereby reducing the primary energy requirement substantially to the energy needed to compress the vapor.

A multi-stage flash distillation process is similar to the multi-stage process previously described in that a number of stages are inserted between a hot source and a cold source. Each stage includes a separate pressure/vacuum chamber, a condensor to condense vapor from within the chamber, and an open channel within the chamber through which brine can flow so that vapor which is given off by the brine can flow freely to the condensor to be condensed and collected. In this process the brine is heated at the first stage to the temperature of the hot source. It then flows in an open channel from one stage to the next until it reaches the final stage. Each stage is at a lower pressure and temperature than its preceeding stage so that as the hot brine flows into a stage, it will be at a higher temperature than the saturation temperature of the stage and will evaporate explosively (flash) until sufficient vapor is evaporated to reduce the brine to the saturation temperature of the stage. This happens throughout the stages until, by the time the flowing hot brine reaches the last stage, it has given up most of its latent heat. In the meantime, cold brine is transported from the last stage to the first, typically within heat exchanging tubes. The cold brine is colder than the saturation temperature of a stage as the cold brine begins flowing through the heat exchanging tubes for that stage, with the consequence that condensation typically takes place on the outside of the heat exchanging tubes and the latent heat of condensation is transferred from the vapor as it condenses, across the walls of the heat-exchanging tubes, to heat the cold brine as it flows within the heat-exchanging tubes for the stage. By the time the cold brine passes through the first or hottest stage (its final stage), it has been heated almost to the temperature of hot brine and an external heating source makes up the difference in temperature.

The condensor within any given stage of a multi-stage flash distillation system is similar to a condensor suitable for use in a steam power plant that operates a steam engine or turbine. In such instances, a cooling liquid flows through the interior of a condensing tube and heat exchange takes place through the walls of the condensing tube with the vapor to be condensed, and if it is unimportant whether the vapor to be condensed came from a flashing brine or from the exhaust of a steam turbine.

Ambient pressure diffusion distillation operates on different principles from the previous methods discussed. In this process, a number of cells are used, similar to the multiple-stage still previously described in that each cell includes an evaporator and a condensor. The first cell is at the highest temperature and has an external heat source to heat its evaporator. The last stage is at the lowest temperature and has an external cold source to extract heat from its condensor. Between the first and last cells, the evaporator of one cell shares a common wall with the condensor of the preceeding cell and is in heat-exchange relationship with it. However, the cells are not evacuated but rather are allowed to remain at ambient atmospheric pressure through the use of small ports which allow air to flow into the cells. The vapor then does not flow directly from the evaporator to the condensor of the cell, but instead diffuses through the air-vapor mixture. Diffusion is much slower than direct or forced flow, and the condensate produced per square foot of heat exchanger surface area is correspondingly less. However, the surface area of the heat exchangers may be increased to compensate for the lower performance.

SUMMARY OF THE INVENTION

In accordance with the present invention, the distillation apparatus is suitable for desalination of sea water or brackish water, and is suitable for use with any of the distillation processes, including vapor-compression distillation, multiple-stage distillation, multi-stage flash distillation, and ambient pressure diffusion distillation. The present apparatus is suitable for more generalized stills for various chemical processes and industrial stills.

According to the present invention, a fluid (typically but not necessarily of the same chemical composition as the condensate) is artificially induced to flow down the condensor surface to coalesce with and remove drops of condensate while they are still too small to flow under the influence of gravity alone, thereby increasing the total flow capabilities of the condensor. The present invention also provides improved construction of a tubular heat-exchange membrane which is readily removable and replaceable to facilitate field maintenance. The present invention further provides treatment of the evaporating surface with a corona discharge, or with a coating of a polymer of greater free surface energy than the base material in order to make the surface wettable where desired.

Specifically, the present invention uses plastic heat exchangers as an attractive alternative to metal exchanges because of lower cost, superior corrosion resistance, and the inherent unwettable surface properties of selected plastic materials.

BRIEF DESCRIPTION OF THE DRAWINGS

FIG. 11 is a side-elevational view of one sectional portion of FIG. 10;

FIG. 12 is a side-elevational view of another sectional portion of FIG. 10;

FIG. 13 is a side-elevational view of yet another sectional portion of FIG. 10;

FIG. 14 is a side-elevational view of still another sectional portion of FIG. 10;

FIG. 20 is a flow-chart of a condensation process for a condensor using a washing fluid according to the present invention;

DESCRIPTION OF THE PREFERRED EMBODIMENTS

Figure 1:
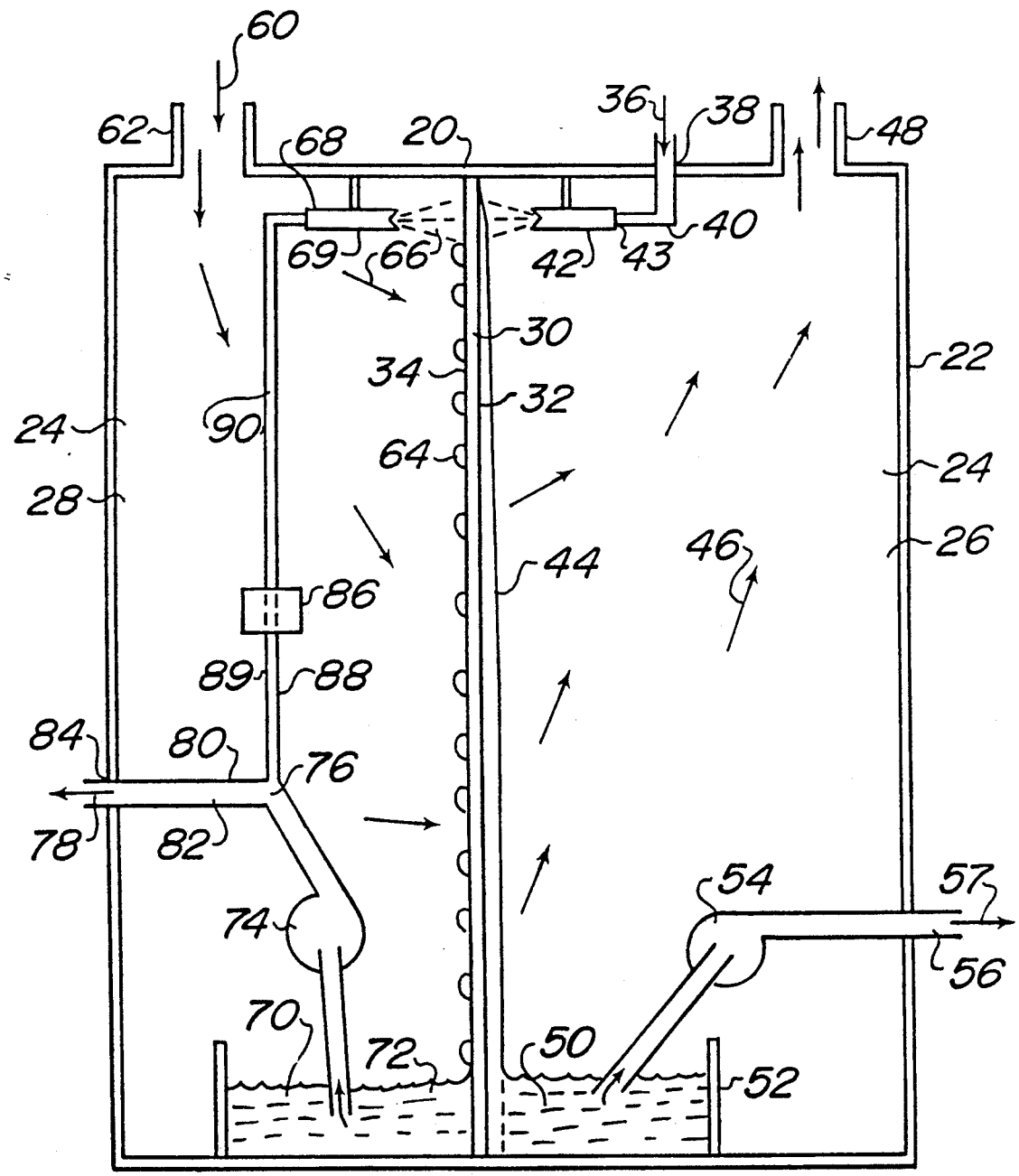
FIG. 1 is a diagrammatic view of a single-stage cell.

It has been determined that, if a heat exchanger is provided in the form of a heat-exchange membrane, then most of the thermal resistance of the exchanger is caused by the resistance of the condensate on one surface of the membrane and of the distilland on the opposite surface, and is typically not due to the thermal resistance of the membrane itself. Hence, the thinner the layer of condensate on the membrane surface, the greater the heat transfer rate across the membrane. If a surface features drop-wise condensation, then whenever a drop of condensate becomes large enough to start flowing down the surface, it will leave behind along its downward path a 'dry' region with only minute drops of condensate remaining. Such 'dry' region will therefore exhibit a very high thermal transfer rate.

However, the unwettability of the surface inhibits drops from sliding down the surface until they have become so large that the overall heat transfer capacity of the exchanger has been seriously impaired. The apparent advantages of drop-wise condensation are typically not realized because of the low heat transfer rates of the drops which have not reached sufficient size to flow freely down the condensor surface but are of sufficient size to impair the heat transfer rate.

In accordance with the present invention, drops of condensate are artificially induced to flow down the non-wettable condensing surface by applying a fluid, called the "washing fluid," to the upper region of the condensing surface in sufficiently large quantity to produce drops which flow of their own accord down the surface, thus "washing" the surface clean of static drops, and the surface thus washed exhibits a high rate of heat transfer. By washing the condensing surface frequently the drops of condensate never reach sufficient size to seriously impair the rate of heat transfer through the condensing surface.

The washing fluid may be the condensate itself, particularly immediately after it has been collected from the condensor surface and before it has had opportunity to change its temperature. However, other fluids such as oils which do not mix well with water and which have different densities than water may also be used as a washing fluid. Then, after such combination of fluids has been collected from the falling drops on the condensor surface, the difference in density (or other physical property) may be used to separate the washing fluid from the water. However, care should be exercised in selecting the washing fluid to assure that a heat-resistive film is not deposited on the condensor surface which would negate the heat transfer improvements achieved by washing the drops of condensation.

It is important that the washing fluid have substantially the same temperature as the condensate. If it is heated to higher than the condensate temperature, energy will have been wasted. If it is lower than the condensate temperature, energy will need to be supplied to the fluid to heat it up to the saturation temperature within the condensor, which energy would typically come from the vapor which is condensing on the washing fluid. This energy could be more effectively utilized if the vapor condenses on the condensor surface so that the latent heat of vaporization can be transferred to the evaporator to preserve the high efficiency of operation.

One simple and effective source of washing fluid is the condensate, a portion of which can be used before the condensate is expelled from the still. If the still is working at a higher temperature than the incoming brine, then the outbound condensate and brine will typically be in heat exchange with the inbound brine. In this case, it is important that the washing fluid be extracted from the condensate before the condensate enters the heat exchanger. The washing fluid is then pumped to the uppermost portion of the condensing surface where it is applied to the condensor surface such as from a spray nozzle or porous distributor.

As the washing fluid is applied to the condensing surface, it forms larger and larger drops until the drops begin to flow down the condensor surface. Although the downward flow can be effective in removing most of the drops of condensation, it may be desirable to constrain the drops to falling within a specified path rather than allowing their downward path to exhibit a certain degree of randomness. Because of this randomness, a larger quantity of washing fluid may be required than if channels are provided to direct the downward flow. Such channels can be provided with thin, vertically oriented plastic rods, or other diverters. However, it should be noted that rods or other diverters may have the detrimental effect of removing a portion of the condensor surface area from the heat exchange process.

Another problem associated with the unwettable surface characteristics of plastics relates to unsuitable behaviour of the distilland on the evaporating surface. Although a film of condensate may be disadvantageous on the condensing surface, a film of distilland is essential on the evaporating surface for high operating efficiency. Dry portions of the evaporating surface do not enter into the heat exchange process and their potential usefulness is wasted. And, the tendency of a liquid to bead on a plastic surface results in substantial dry portions and lower operating efficiency of a plastic. Also, the drops of distilland can reach a speed greater than three or four feet per second as they flow down an unwettable plastic surface. It is desirable to keep the distilland in contact with the surface of the evaporator for a long period of time to avoid having to recycle the distilland many times. Conventional techniques of relying upon screens and wicking materials to maintain a thin film of distilland on the evaporating surfaces are not cost effective, and such screens and wicks interfere with heat flow wherever they touch the membrane surface. With typical screen design, this can represent almost half of the surface.

Wettability of a surface relates to the angle formed between a drop of liquid and the surface at the boundary of the drop on the surface. If the angle is zero, the surface is completely wettable. If the angle is ninety or more degrees, the surface is completely unwettable. A partially wettable surface is still a wettable surface in the sense that it is possible for a film of liquid to completely cover the surface if the liquid film is sufficiently thick. The more wettable the surface, the thinner the film may be, and vice-versa. All surfaces have a degree of free energy associated with them, which is a measure of their surface tension. Pure water is about 72 dynes per square centimeter (d/sq cm), and sea water is about 73 d/sq cm. If the free energy of a solid surface is greater than the free energy of water, usually water will wet it. Glass and metals have a surface tension over 100 d/sq cm and are thus easily wetted by water. Most polymers are under 45 d/sq cm and are unwettable by water. Polyethylene is about 31 d/sq cm. Pure alcohols tend to be below 30 d/sq cm, and thus they can readily wet even polyethylene.

It is possible to add a surfactant to the water to be distilled in order to reduce its surface tension and increase its ability to wet a plastic evaporator surface. Thus, an untreated surface of a plastic membrane could exhibit a film-wise flow of surfactant-treated distilland and a drop-wise flow of condensate on opposite surfaces.

A wettable surface simplifies achieving an even, film-wise flow of distilland on an evaporative surface and also allows for a much slower rate of flow. The more wettable the surface, the thinner the film of distilland that can be maintained and the slower the downward flow. With very thin films of distilland it is possible to achieve a net effective downward flow on a vertical tube evaporator surface of only a few inches per second. This means that the distilland needs to be recycled only a minimum number of times, if at all, thus reducing pumping costs.

One way to form a wettable evaporating surface is to laminate or coat a wettable layer onto an unwettable base layer. For instance, polyethylene is strong, has outstanding thermal conductivity, and is unwettable, and it makes an excellent condensing surface and an excellent base for a second polymer which is more wettable for proper evaporation from the opposite side. And, liquified neoprene can be applied as a thin coat onto the polyethylene evaporating surface through rolling or spraying. Since neoprene has a surface which is partially wettable by sea water, its surface can be thoroughly wetted if a high enough flow rate of sea water is maintained over it. If a surfactant is added to sea water as the distilland, the wettability of the distilland relative to the neoprene will be increased and the flow can be thinner and slower while maintaining a fully wet evaporating surface. The amount of surfactant needed to wet neoprene is significantly less than the amount needed to wet polyethylene.

Other polymers can also be used to enhance the wettability of certain plastics such as polyethylene. Various amides and other elastomers besides neoprene are suitable. Neoprene has the advantages of easy commercial availability in solvent form with excellent salt water resistance after it is applied and is relatively inexpensive.

In accordance with another embodiment of the present invention a plastic evaporator surface is treated with a corona discharge in order to make it wettable. Corona treatment is based on creating a corona discharge over the evaporator surface to be treated. A high frequency, high voltage electrode is placed near the surface to be treated to create a corona of high-energy oxygen in the form of molecular oxygen and ozone. The high-energy oxygen is believed to break the molecules of the material near the treated surface into free radicals which combine with the molecular oxygen to form an oxidized surface that is polarized and easily wettable. Typically, only the outermost layer of molecules are affected and treatment is permanent for the oxidized molecules, but is very fragile. Abrasion that can remove as little as a single layer of molecules will alter the wettability of the treated surface. It is therefore desirable that the flow of distilland over a corona-treated polyethylene evaporation surface be kept as thin and slow as possible to reduce degradation of the wettability of the treated surface by the distilland.

It has been determined that polyethylene film takes approximately 5 watt-minutes of energy per square-foot to treat the surface, effectively raising its surface tension from about 31 d/sq to about 80 d/sq cm. Mylar can be similarly treated about 1 watt-minutes per square foot. Corona treatment of an inherently unwettable surface also allows coatings such as neoprene, as previously described, to adhere easily to it. Another variation of a treatment suitable for increasing the wettability of an evaporating surface is to coat it with a non-organic mineral deposit. For instance, the build-up of scale on the evaporating surfaces of a still has been a continuing source of problems. However, scale, as is common with most inorganic solids, has a free surface energy over 100 d/sq cm and is therefor inherently wettable. Hence, the deposition of a thin, uniform layer of a mineral such as calcium sulfate on a plastic heat exchanger can make the surface wettable.

The following sequence may be used to coat the surface: 1. corona treat the surface. 2. Apply a thin, uniform film of liquid saturated or super-saturated with the mineral to be deposited on to the surface. 3. Use a combination of heat and vacuum to evaporate some or all of the liquid, thus precipitating the mineral onto the surface. 4. Thoroughly dry the deposited mineral with a flow of warm air. The corona treatment facilitates the mineral deposition in that it allows the mineral to be deposited evenly across the surface with a controlled thickness. Typically, without the corona treatment, the liquid will bead-up and the deposits will be irregular, with bare, deposit-free regions separating clusters of thick deposits.

The primary purpose of applying a mineral deposit to a surface which has already been corona treated is to achieve greater durability. A mineral deposit may be up to $\frac{1}{4}$ mil thick (0.00025 inch) without seriously impacting heat flow through the exchanger. By contrast, a corona treatment only affects the outermost single layer of molecules of the surface and is thus quite delicate. A mineral deposit therefore provides a surface which is more rugged, thereby simplifying handling requirements during manufacturing and giving a potentially greater operational lifetime.

The ideal mineral: 1. can be bonded evenly to the heat exchange membrane, either with or without corona treatment, and either directly or indirectly (i.e., bonding onto a second material such as neoprene which has first been bonded to the membrane); 2. will not readily dissolve in sea-water; and 3. can withstand the application of an acid treatment to the membrane for the removal of micro-organisms and scale such as calcium carbonate and magnesium hydroxide which may attach to the evaporator surface. In general calcium sulfate may be considered representative of those minerals which meet these requirements. A plastic heat-exchange membrane with a corona-treated evaporating surface, or with a wettable polymer coating or mineral coating on the evaporating surface, as described above, is inherently suitable for use in all of the distillation processes discussed above which use an evaporation surface.

In a vapor-compression or multi-stage still, the condensing surface is typically at a higher pressure than the heat-dissipating, or evaporating surface. Furthermore, the heat dissipating surface typically supports as thin a film of distilland as possible in order to promote efficient evaporation, and this thin film is surrounded by vapor except at the evaporating surface. If support is needed for the heat exchanger formed of a thin plastic film, a screen mesh may be placed on the side of the plastic film opposite the condensing surface where the condensing surface is typically on the inside of a tube that operates at higher relative pressure.

In a heat exchanger suitable for a steam turbine condensor or for the condensor of a multi-stage flash still, a heat-absorbing liquid is typically introduced into one end of a heat-exchanging tube and is removed from the other end. Typically, this liquid will not have any contact with vapor at all. Condensation typically takes place on the outside of the tube, and the pressure on the condensor surface will typically be lower than the pressure of the heat-absorbing liquid within the tube. Furthermore, if a screen mesh is used to support a plastic heat exchanger, then it should be placed on the condensing surface, or lower pressure side of the plastic heat exchanger. Then, it will be desirable to keep the pitch of the mesh strands large enough that condensate and washing fluid can readily flow down the surface of the condensor and not be trapped by the surface tension of the mesh strands. Typically, the pitch should therefore be greater than ¼ inch.

In an ambient-pressure diffusion still, a plastic heat exchange membrane, such as previously described, may be used between two cells with the drop-wise promoting surface operating as the condensing surface and the film-wise promoting surface operating as the evaporating surface.

Referring now to FIG. 1, there is shown a single-stage cell 20 within a housing 22 which encloses a chamber 24 and which is further divided into an evaporation chamber 26 and a condensation chamber 28 by a heat-exchange membrane 30 which has a significant vertical component to its orientation. The heat-exchange membrane 30 has an evaporator surface 32 and a condensor surface 34. Source distilland 36 enters the housing 22 at a distilland inlet port 38 and is carried by a source distilland tube 40 to a distilland spray nozzle 42 which sprays the distilland onto the evaporator surface 32 that forms the distilland film 44. A portion of the distilland film 44 is vaporized as an evaporate 46 which flows from the evaporation chamber 26 through evaporate output port 48. The remaining portion of the distilland in film 44 flows into a distilland accumulator 50 where it is collected as used distilland 52. A distilland output pump 54 pressurizes the used distilland 52 to expel it from the evaporation chamber 26 through used-distilland output port 56. Vapor to be condensed 60 enters the condensation chamber 28 at higher pressure through vapor inlet port 62 and is condensed as drops on the condensor surface 34 as a condensate 64. In accordance with the present invention, a washing fluid 66 is applied by washing-fluid spray-nozzle 68 of a washing-fluid applicator 69 onto the uppermost portion of the condensor surface 34 in sufficient quantity to initiate a downward flow of drops of the washing fluid 66 on the condensor surface 34. As the washing fluid 66 flows downward, it coalesces with the static drops of condensate 64, and carries larger drops along its downward journey until they flow into a condensate accumulator 70 as the accumulated mixture 72. A washing-fluid pump 74 pressurizes the accumulated mixture 72 and transports it to a product condensate diverter 76 which separates the condensate 78 from the accumulated mixture 72 (if the condensate and washing fluid are immiscible) and delivers it via product condensate tube 82 to the product condensate output port 84. The product condensate 78, which has already been pressurized, is thus removed from the condensation chamber 28 through the outlet port 84. The product condensate diverter 76 supplies or recycles the remaining portion of the accumulated mixture 72 to a washing-fluid control unit 86 as accumulated washing fluid 88 via the supply tube 89. The control unit 86 regulates the flow of accumulated washing fluid 88 that is delivered to the washing fluid applicator 69 via the washing fluid supply tube 90.

The heat exchange membrane 30 according to the present invention is a film of plastic composition that forms a condensor surface 32 which is inherently unwettable by the condensate 64. Linear polyethylene and mylar are typical materials suitable for the membrane 30. The evaporator surface 32 of the membrane 30 is corona-discharge treated in order to render it wettable with respect to the distilland 44. Commercially-available equipment from Tantec Inc. of Schaumburg Ill. includes a groundless corona electrode which can be made into almost any shape to provide corona treatment of the evaporative surface.

Figure 2:
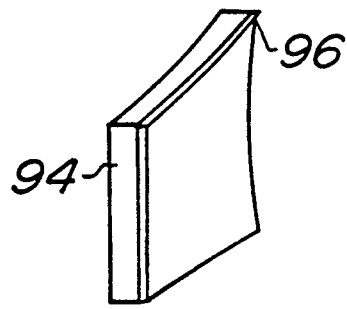
FIG. 2 is a side elevation view of a heat-exchange membrane used in the single-stage cell of FIG. 1.

Referring to FIG. 2, there is shown an alternate embodiment of heat exchange membrane 30 in which the membrane 30 includes two layers intimately bonded together to provide an unwettable layer 94 on one face which functions as a condensor surface 34, and an opposite face which is bonded to a wettable layer 96, the outer or opposite face of which functions as an evaporator surface 32. The unwettable layer 94 includes a material which is inherently unwettable with respect to the condensate 64, and may be made of a polymer or a mineral deposit which is at least partially wettable, as previously described, and which is easier to wet than the unwettable layer 94 with respect to the distilland 44. If said wettable layer 94 is made of a polymer, then, depending on the exact chemical composition of the distilland 44, one or more of the following polymers may give suitable wetting characteristics: latex, neoprene, and hypalon. Depending on the thickness of the layers and their various chemical characteristics, the unwettable layer 94 may be laminated to the wettable layer 96 with pressure and heat, or with pressure, cement, and heat. More typically, however, the unwettable layer 94 may provide a base onto which the wettable layer 96 may be spray coated or rolled. Preferrably, the unwettable layer 94 may be under one mil thick and the wettable layer 95 be under ½ mil thick in order not to impact the heat transfer characteristics of the membrane 30. However, the operating temperature, the creep and strength characteristics of the materials used at the operating temperature, and the pressure differences between the two sides of the membrane will be considered in selecting the actual thickness of the materials. If the wettable layer 94 includes a mineral deposit, such layer may be deposited as previously described.

Figure 3:
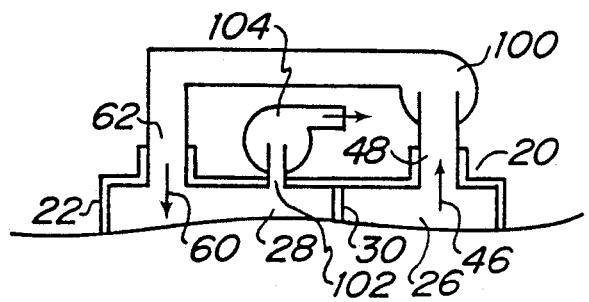
FIG. 3 is an embodiment of FIG. 1 in a vapor compression still.

The single-stage cell 20 illustrated in FIG. 1 could be used in a vapor-compression still, a multi-stage (MEF) still, or an ambient-pressure diffusion still. However, with reference to the partial sectional view of FIG. 3 if such single stage cell 20 is used in a vapor compression still, then the evaporate 46 passes from the single stage cell 20 through evaporate output port 48 to the input of a vapor-compressor 100 which compresses the vapor and introduces it into the single stage cell 20 through the vapor inlet port 62 where it becomes the vapor to be condensed 60. Outgas port 102 with connected vacuum pump 104 removes non-condensible vapors from the single stage cell 20, as is necessary for proper operation of the vapor compression still.

Figure 4:
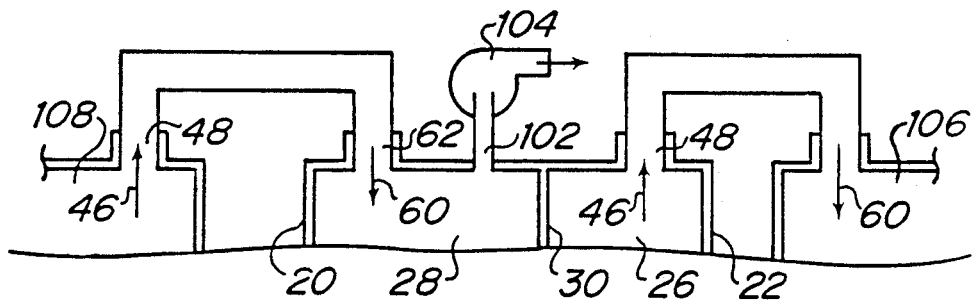
FIG. 4 is an embodiment of FIG. 1 a multi-effect still.

With reference to the partial sectional view of FIG. 4, single stage cells 20 are assembled into a multi-stage still such that the evaporate 46 passes from one cell 20 through evaporate output port 48 to the vapor input of the next cell or lower temperature 106. A cell 108 operating at next higher temperature effect supplies vapor which passes into the single stage cell 20 through the vapor inlet port 62 where it becomes the vapor to be condensed 60. Outgas ports 102 with vacuum pump 104 remove non-condensible vapors from the single stage cell 20, as is necessary for proper operation of the vapor compression still.

Figure 5:
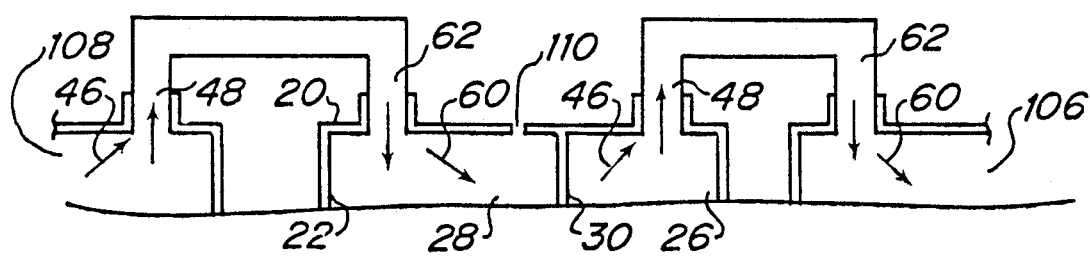
FIG. 5 is an embodiment of FIG. 1 in an ambient pressure diffusion still.

With reference to the partial sectional view of FIG. 5, an ambient-pressure diffusion still includes substantially the same diagrammatic structure as the multi-stage still described above, except that the single stage cell 20 is permitted to operate with internal pressure at ambient atmospheric pressure, as determined by pressure equalizing inlet port 110.

Figure 6:
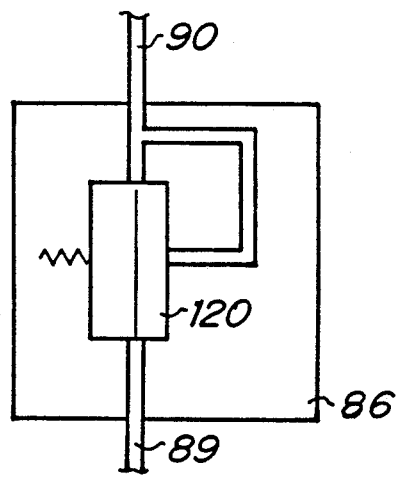
FIG. 6 is an embodiment of a washing fluid control unit for the cell of FIG. 1.

Referring now to FIG. 6, there is shown an embodiment of a washing fluid control unit 86 including a constant-pressure valve 120. The accumulated washing fluid is supplied to the constant pressure valve 120 via control unit supply tube 89 and is reduced to the correct operating pressure by the constant pressure valve 120 as it passes into the washing fluid supply tube 90 for continuous delivery to applicator 69.

Figure 7:
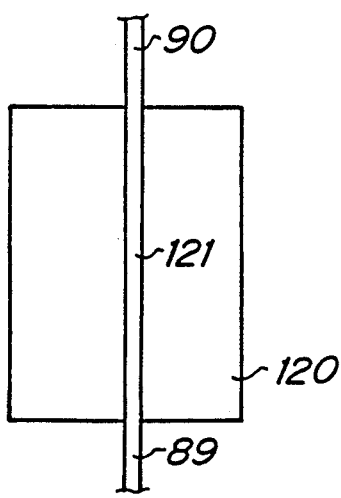
FIG. 7 is another embodiment of a washing fluid control unit for the cell of FIG. 1.

One simple alternative embodiment of a washing fluid control unit 86 is illustrated in FIG. 7 as simply a straight tube 121 directly connecting the control unit supply tube 89 to the washing fluid supply tube 90. Although this embodiment does not allow a precise control of the flow of accumulated washing fluid 88 into the washing fluid applicator 69 it may nevertheless provide less-than-the-optimum flow of washing fluid 66 on the condensor surface 34 with some degradation of maximally efficient performance of the heat exchange membrane 30 attributable to excess pumping energy provided to supply excess washing.

Figure 8:
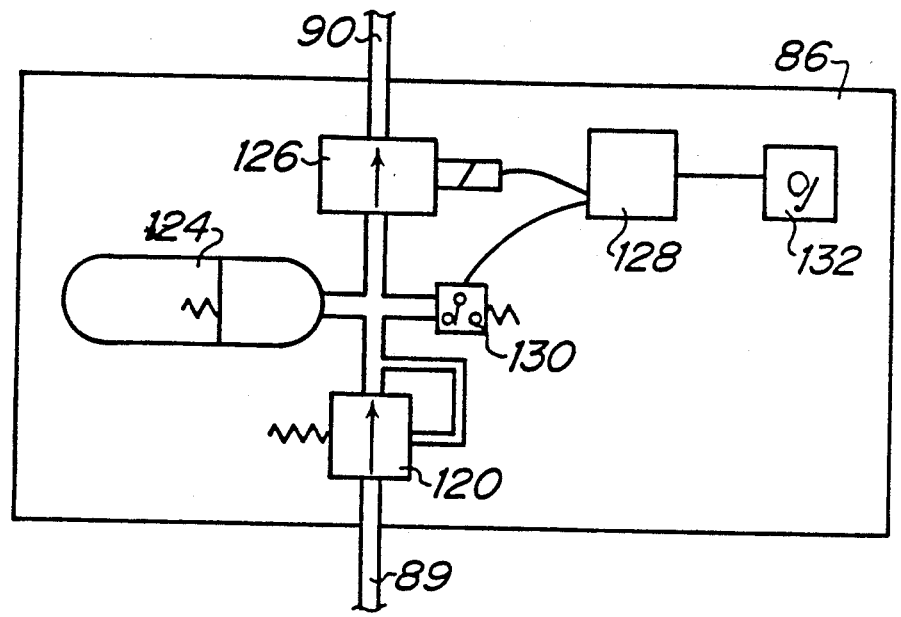
FIG. 8 is yet another embodiment of a washing fluid control unit for the cell of FIG. 1.

Referring now to FIG. 8, there is shown an embodiment of the washing fluid control unit 86 which allows washing fluid 66 to be sprayed in periodic, large spurts instead of in a continuous mist, as is provided in the embodiments discussed above in connection with FIG. 6. In general, a continuous mist works adequately well, is simpler to build, and requires less maintenance than a periodic spray. However, in still designs that locate the washing fluid spray nozzle 68 near a heat exchange tube where a high velocity of the vapor to be condensed 60 is flowing into the condensing chamber, then the vapor 60 may be of sufficiently high velocity to interfere with the application of the washing fluid 66 onto the condensor surface 34. Such interference may be reduced by spraying larger drops of washing fluid 66 and at a higher velocity. However, this increases the total flow of washing fluid 66 beyond the optimum value and will result in excessive pumping costs unless the flow is reduced to a periodic flow.

A periodic washing fluid control unit uses a constant pressure valve 120 to supply accumulated washing fluid 88 at a predetermined pressure to a constant-pressure storage tank 124. A fluid control valve 132 is solenoid operated to control the flow of accumulated washing fluid 88 between the storage tank 124 and the washing fluid supply tube 90. A valve control module 128 opens and closes the fluid control valve 126 at fixed time intervals of approximately two or three seconds open and thirty seconds to a minute closed, as may be required for the particular still design. In the event of a malfunction such as the constant pressure storage tank 124 filling to capacity without valve 126 opening, damage will be prevented to system components by the pressure regulating function of the constant pressure valve 120 which thus alters the portion of product condensate 78 flowing out of the product condensate diverter 76 to compensate for the decreased flow of washing fluid 66. A pressure switch 130 monitors the pressure of the tank 124 and opens the valve 126 and activates an alarm 132 if the pressure exceeds a selected level.

Figure 9:
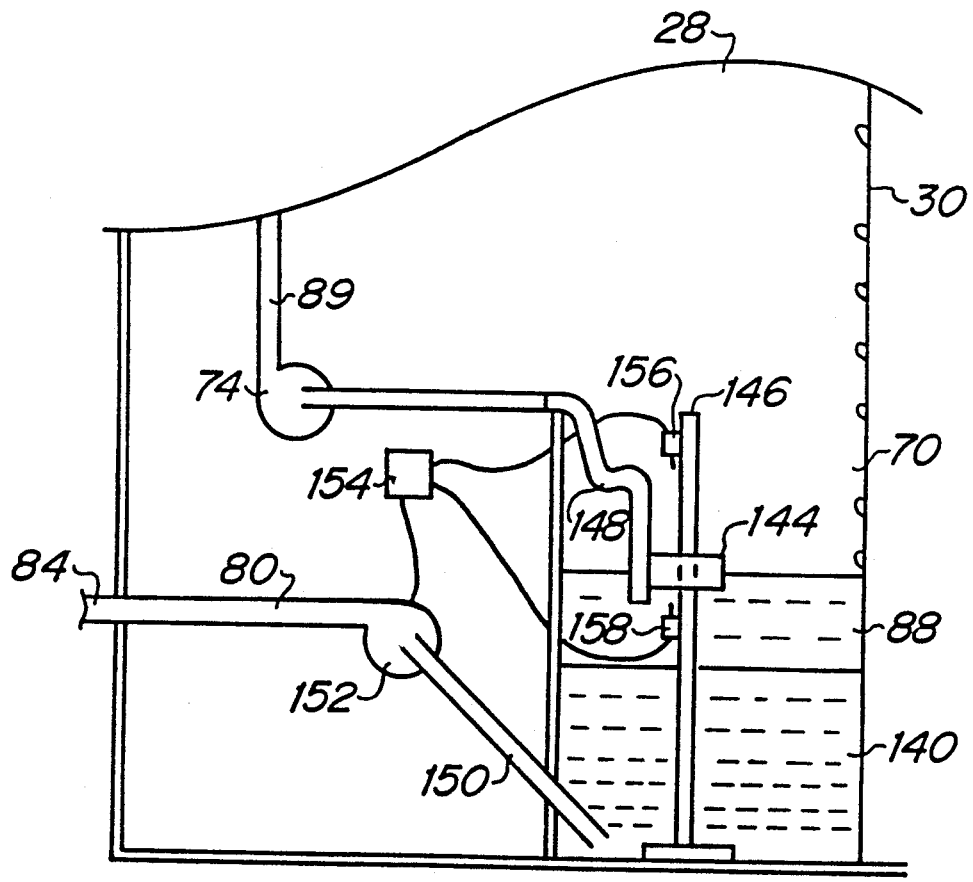
FIG. 9 is an alternative embodiment of the washing fluid recycling means of FIG. 1.

The preceding description assumed that the washing fluid 66 and the condensate 64 are chemically identical, or are miscible liquids. In FIG. 9 there is shown an embodiment in which washing fluid 66 includes a light oil that is immiscible with the condensate 64 which is typically (but not necessarily) water. The accumulated mixture 72 separates within the condensor accumulator 70 under the influence of gravity into accumulated condensate 140 and accumulated washing fluid 88, where the washing fluid 88 (e.g., a light oil) floats on the condensate 140. A float 144 floats on the washing fluid 88, moving up and down on float stand 146. The inlet of a flexible washing fluid takeup tube 148 is mounted on the float 144 to rise up and drop down therewith, and is located close to the upper surface of the accumulated washing fluid 88 and as far away from where the accumulated mixture 72 enters the condensor accumulator 70 a is practical in order to allow sufficient opportunity for the two liquids to separate. The accumulated washing fluid 88 flows into said washing fluid takeup tube 148 to the washing fluid pump 74 where it is pressurized and delivered to the washing fluid control unit 86 via the control unit supply tube 89.

The accumulated condensate is extracted from the bottom of the accumulator 70 through a condensate take-up tube 150 and is pressurized by a condensate pump 152 for transfer through the condensate output tube 80 and out of the cell 20 through the product condensate output port 84. The pump 152 is controlled by a pump control module 154 which supplies power to the pump 152 when the float 144 reaches an upper limit switch 156 located on the float stand 146, and removes power when the float 144 reaches a lower limit switch 158. The lower limit switch 158 is located on the float stand 146 at a sufficiently high level to insure that the condensate pump 152 shuts off before the accumulated condensate 140 is exhausted from the condensate accumulator 70, thereby preventing accumulated washing fluid 88 from being sucked into the condensate take-up tube 150 and contaminating the product condensate 78.

Figure 10A:
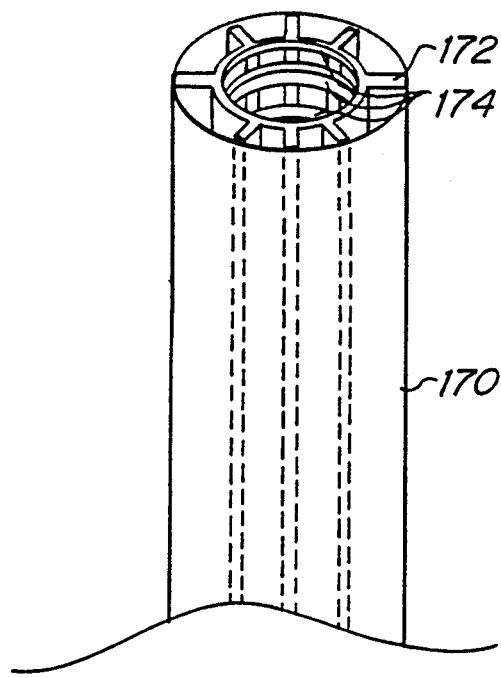
FIG. 10(A) is a perspective partial view of a heat/exchanger tube according to the present invention.

Referring to FIG. 10(A), there is shown a heat exchange membrane 30 in the form of a heat exchange tube 170, wherein the evaporator surface 32 lies on the outer portion and the condensor surface 34 lies on the inner portion of the heat exchange tube 170. A series of channel rods 172 are located within the tube 170 to direct the path of the washing fluid 66 along its downward journey on the condensor surface 34 of the tube 170. The channel rods 172 are held in place by rod supports 174 which include a series of rings perpendicular to the channel rods 172. The rod supports 174 are joined to the channel rods 172 far enough away from the condensor surface 34 so as not to interfere with the downward flow of washing fluid 66 on the surface 34.

The channel rods 172 and the rod supports 174 may be injection molded as a unit using a plastic such as polystyrene which is recomended because of its ease of injection molding, its low expense, its rigidty, and its approval by the FDA for contact with drinking water. It is acceptable for a small amount of clearance to exist between the outer edges of the channel rods 172 and the condensor surface 34. Such clearance facilitates insertion of the channel rods 172 and rod supports 174 into the tube 170. However, this clearance should be less than the diameter of the smallest drop which can flow freely down the condensor surface 172.

Figure 10B:
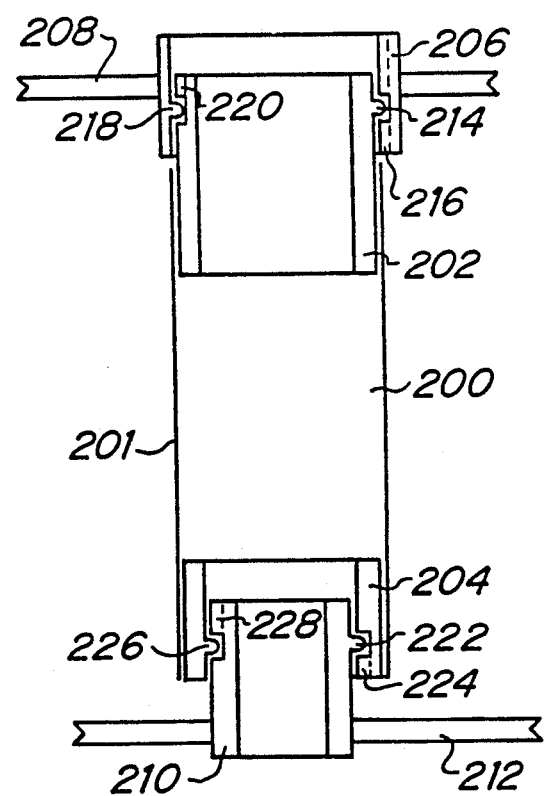
FIG. 10(B) is a side-elevational, partial sectional view of a heat exchange tube according to the present invention.

Referring now to FIG. 10(B), there is shown a partial sectional view of the basic construction of a heat exchanger tube 200 according to the present invention for use in all of the various types of stills previously described. The construction of the heat exchanger tube 200 facilitates easy factory assembly and easy removal and replacement of a tube by maintenance personnel in the field. The heat exchanger tube 200 includes a membrane 201 which is a tubular embodiment of the heat exchange membrane 30 in FIG. 1. A membrane nipple 202 is partially inserted and sealed into the upper end of the membrane 201 and a membrane receiver 204 is inserted and sealed into the lower end of the membrane 201. The seals may be formed by such suitable techniques as heat sealing or cementing or thermo-compression bonding. The outer diameter of the membrane nipple 202 and the membrane receiver 204 are both substantially equal to the inner diameter of the membrane 201. Where the membrane 201 is formed of linear polyethylene, a suitable cement is commercially available from the 3M Company of St. Paul, Minn. as Plastic Adhesive 4693 which is believed to include a synthetic elastomer base dissolved in cyclohexane and methylene chloride that adheres well to linear polyethylene.

A plate receiver 206 penetrates and is permanently fastened to an upper plate 208 and a plate nipple 210 penetrates and is permanently fastened to a lower plate 212 to project above it. The portion of the membrane nipple 202 which is not inserted into the membrane 201 has substantially the same outer diameter as the inner diameter of the plate receiver 206 to facilitate insertion of the membrane nipple 202 into the plate receiver 206 tightly enough to prevent the passage of vapor and to prevent unintentional dislodging of the components, but loosely enough to allow removal of the membrane nipple 202 from the plate receiver 206 for maintenance or replacement.

That portion of the plate nipple 210 which projects above the lower plate 212 has an outer diameter that is substantially the same size as the inner diameter of the membrane receiver 204 so that the membrane receiver 204 may be slipped over the plate receiver 206 tightly enough to prevent the passage of vapor, and to prevent unintentional dislodging of the components, but loosely enough to allow removal of the membrane receiver 204 from the plate nipple 210 for maintenance or replacement.

The membrane nipple 202, membrane receiver 204, plate receiver 206 and plate nipple 210 are made of a rigid material such as metals or plastic, and in one embodiment are made from polystyrene plastic which is rigid, inexpensive, and FDA approved for contact with drinking water.

The placement of a nipple in the upper end of the membrane 201 and a receiver in the lower end is based upon the distilland flowing on the outside of the membrane 201 and the condensate on the inside. As may be readily determined from FIG. 10, this arrangement helps prevent distilland from leaking through a faulty nipple-receiver combination and into the condensate region by insuring that the distilland has an uphill path against higher pressure gradient to reach the condensate at both the lower and upper ends of the membrane 201.

If friction is inadequate to hold the membrane nipple 202 in place in the plate receiver 206, and is inadequate to hold the membrane receiver 204 in place over the plate nipple 210, then additional support may be provided by one or more of the attachment schemes illustrated in FIGS. 11–14. Specifically, an upper nipple tit 214 which projects from an outer portion of the membrane nipple 202 and passes within an associated upper receiver groove 216, where the upper receiver groove 216 is located in the inner portion of the plate receiver 206. Alternatively, an upper receiver tit 218 projects inwardly from the plate receiver 206 and passes within an associated upper nipple groove 220 which is located in the outer portion of said membrane nipple 202, or, a lower nipple tit 222 projects outwardly from the plate nipple 210 and passes within an associated lower receiver groove 224 which is located on the inner portion of the membrane receiver 204. Finally, a lower receiver tit 226 projects inwardly from the membrane receiver 204 and passes within an associated lower nipple groove 228 which is located on the outer portion of the plate nipple 210.

In general, such tits and grooves at the upper end of the tube 200 assure secure mounting in place. Then the membrane receiver 204 at the lower end of the tube 200 is slid over the plate nipple 210 until the heat exchange membrane 30 is appropriately tight and friction is allowed to maintain the appropriate tension. It is important, however, that said membrane 30 be kept tight and not be floppy.

Figure 15:
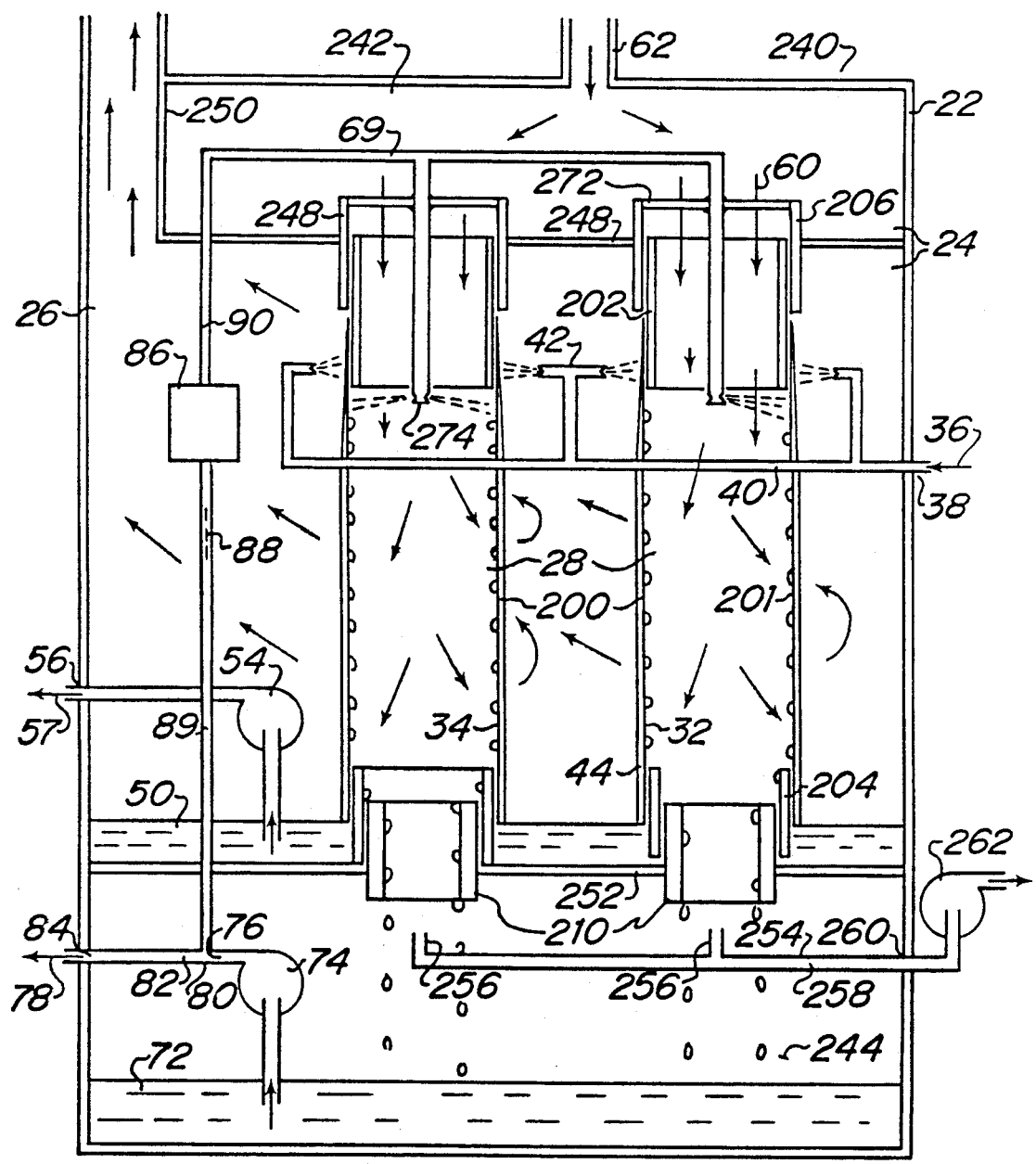
FIG. 15 is a side-elevational view of the tube of FIG. 10 for use in the cell of FIG. 1.

Referring now to FIG. 15, there is shown the heat exchanger tube of FIG. 10 used in a single-stage cell 240 such as is illustrated in FIG. 1. The cell 240 includes housing 22 to enclose the chamber 24 which is further divided into an evaporation chamber 26 and a condensation chamber 28. The evaporation chamber 26 is bounded by the walls of the housing 22, the heat exchanger tubes 200, a vapor distribution manifold 242, and accumulator 244. The vapor distribution manifold 242 includes manifold plate 246, manifold receiver 248, vapor inlet port 62, a portion of the housing 22, and manifold wall 250. The heat exchanger tube 200 includes membrane 201, membrane nipple 202, and membrane receiver 204. The accumulator 244 includes an accumulator plate 252, plate receiver 206, and a portion of the housing 22. Also contained within the accumulator is a pump for removing non-condensible vapor, including vapor inlet tubes 256, vapor transport tubes 258, vapor outlet port 260, and vacuum pump 262. Uncondensed vapors in the vicinity of the vapor inlet tubes 256 are drawn into the tubes 256 and transported by the vapor transport tubes 258 through the vapor outlet port 260 to vacuum pump 262 which pressurizes the vapor sufficiently to be exhausted into the atmosphere.

The source distilland 36 enters the evaporation chamber 26 through the distilland inlet port 38 and is carried by the source distilland tube 40 to the distilland spray nozzles 42. The source distilland 36 is sprayed on the evaporator surface 32 of the membrane 201. In the condensation chamber, the washing fluid supply tube 90 carries accumulated washing fluid 88 to the washing fluid applicator 69 that includes washing fluid distribution tube 270, washing fluid nozzle supports 272, and washing fluid nozzles 274. The washing fluid nozzle supports 272 are fastened to the plate receiver 206 on one end and to the washing fluid nozzles 274 on the other, and are formed of thin, rigid rods to provide adequate support for the washing fluid nozzles 274, but not to interfere with vapor to be condensed 60 which flows past them.

It is desirable to avoid interference between the flow of vapor to be condensed 60 and the washing fluid 66 reaching the condensor surface 34 of the membrane 201. This may require that the washing fluid be supplied in powerful spurts (instead of in a fine, steady mist) in the manner as previously described with reference to FIG. 7.

Figure 16:
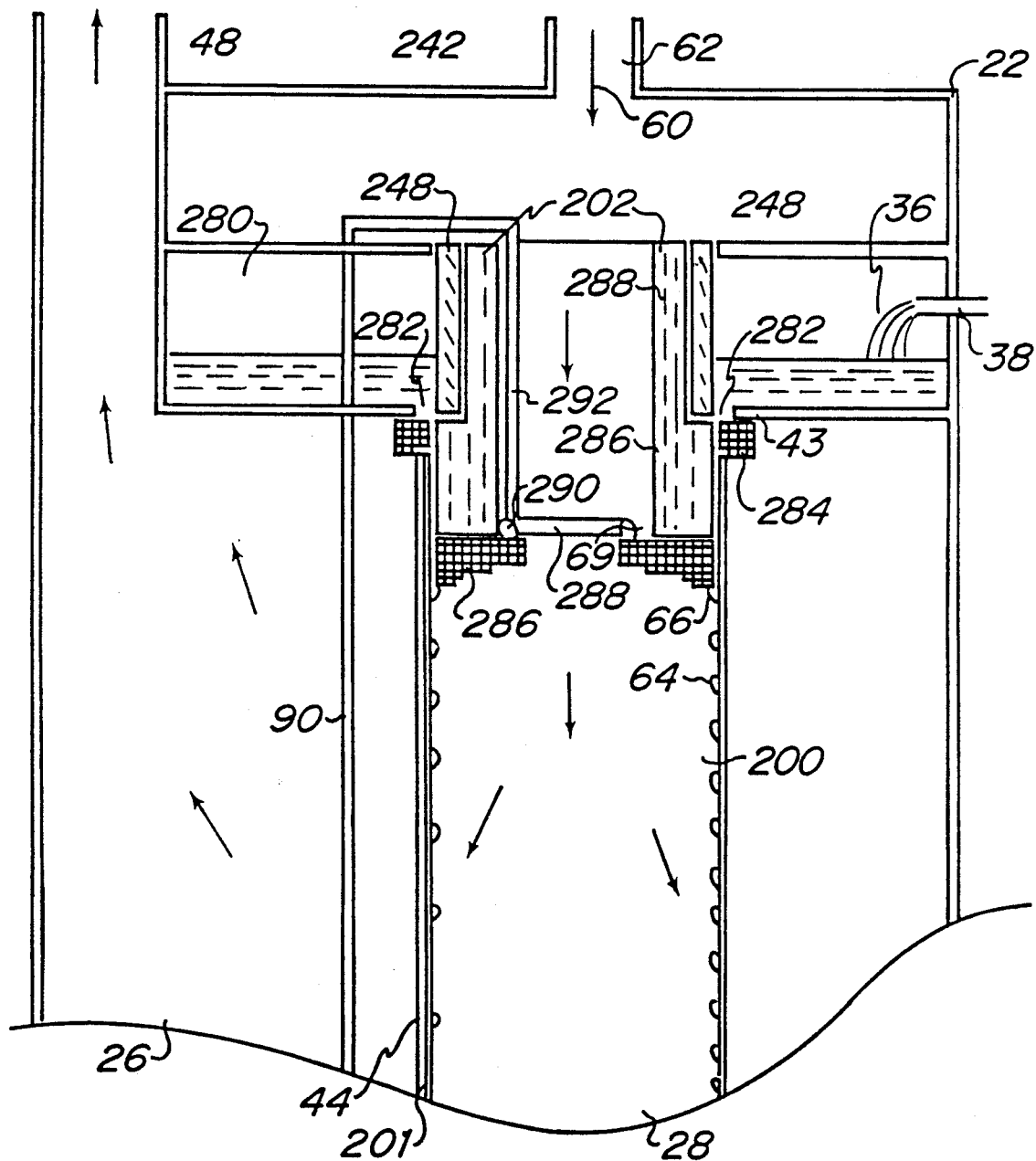
FIG. 16 is an alternative embodiment of the tube of FIG. 15.

With reference now to FIG. 16, there is shown a modification of the upper portion of the embodiment of FIG. 15 in which the distilland 44 and the washing fluid 66 may each be applied to the membrane 201 using a wicking or similar direct-contact distribution scheme instead of spraying. Wicking of washing fluid has the advantage of allowing it to be continuously applied independently of the velocity and density of the vapor to be condensed. Located under the vapor distribution manifold 242 is a distilland manifold 280 which receives source distilland 36 directly through the distilland inlet port 38. The manifold receiver 248 passes through the distilland manifold 280, with a small gap 282 being formed between the two. The source distilland 36 passes through the gap 282 onto a distilland wick 284 which is typically a fiberglass wick cemented onto the outer, to portion of the tube 200. Fiberglass is the preferred wick composition because it is easily wettable, does not corrode, is inexpensive, and is easily cemented. In this embodiment the membrane nipple 202 is divided into an inner portion 286 and an outer portion 288, where the inner portion 286 includes the portion which is inserted into the membrane 201 and the outer portion 288 includes the portion which is inserted into the manifold receiver 248. The outer circumference of the inner portion 286 should be substantially the same diameter as the outer circumference of the manifold receiver 248 and outer circumference of the outer portion 288 should be substantially the same diameter as the inner circumference of the manifold receiver 248. This permits the membrane nipple 202 to be inserted into the manifold receiver 248 with a tight fit while also allowing the gap 282 to be correctly positioned to distribute the distilland 44 onto the distilland wick 284.

The washing fluid 66 may be distributed onto the condensor surface by means of a washing fluid wick 286 which is cemented to the bottom of the membrane nipple 202. Resting on but not fastened to the washing fluid wick 286 is a washing fluid distribution ring 288 which has a number of orifices 290 along its bottom wall that open directly onto the washing fluid wick 286. A washing fluid support tube 292 supports the ring 288 and also supplies washing fluid 66 thereto. The washing fluid support tube 292 is fastened to the manifold receiver 248 for support and is connected to the washing fluid distribution tube 270 to receive supply of washing fluid 66.

Figure 17:
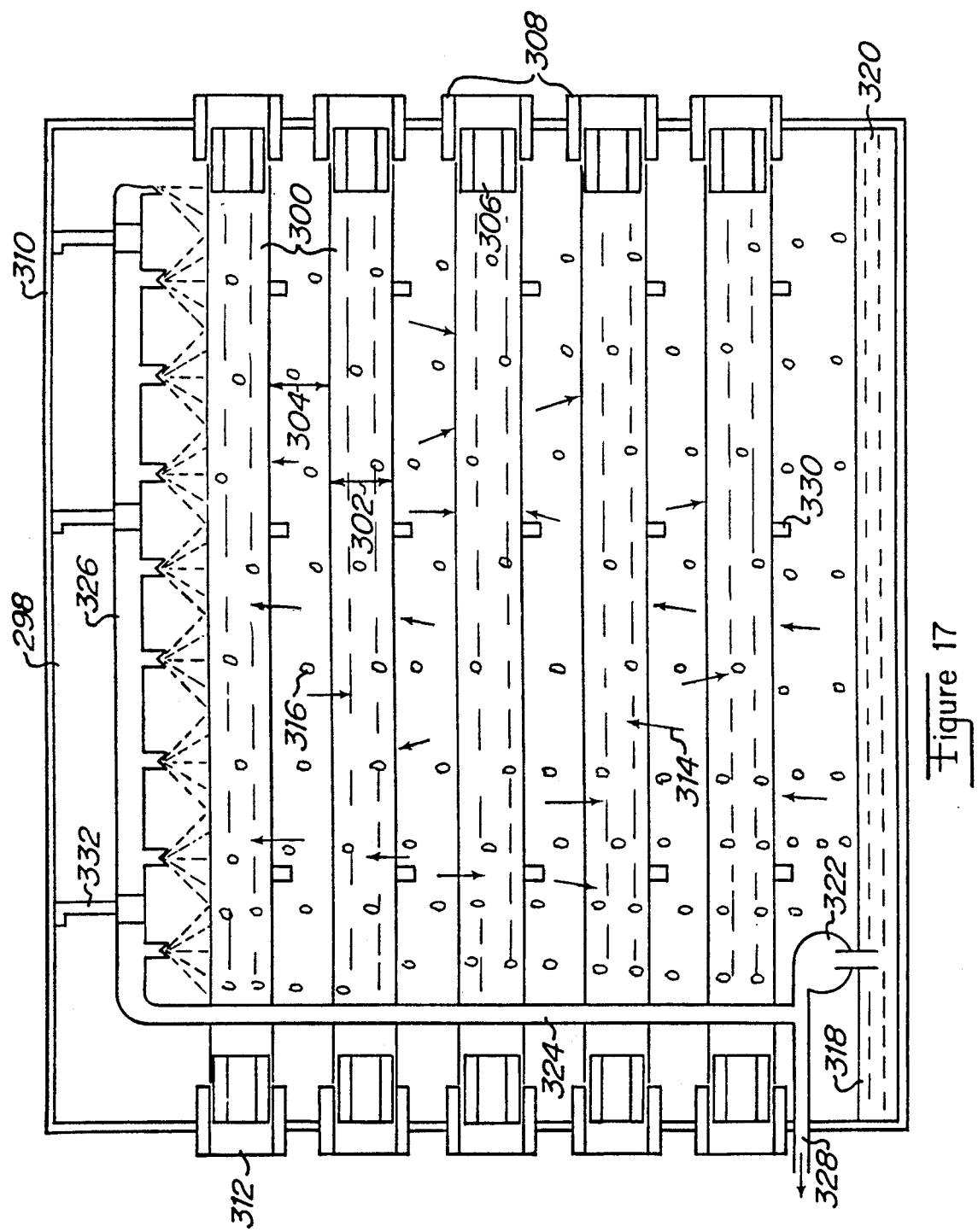
FIG. 17 is a front-elevational view in section of the tube of FIG. 10 for use in a steam condensor application.

Referring now to FIG. 17, there is shown a condensor 298 suitable for use in condensing the vapor created by multi-stage flash still or by a steam power plant. A series of horizontally-oriented condensor tubes 300 made of a plastic such as polyethylene film are stacked vertically one over the other. In this embodiment the condensing surface 302 is outside the tube and the cooling surface 304 is on the inside. A condensor tube nipple 306 is partially inserted at each end of each of said condensor tubes 300 and then sealed with heat or cement. The remaining portion of each condensor tube nipple 306 is inserted into a condensor receiver 308 in such a way as to allow easy removal as necessary for maintenance while providing a liquid and vapor proof union when inserted. The condensor receivers 308 penetrate a condensor housing 310 and also serve as a port means for a cooling liquid 312 to enter the condensor tubes 300 at one end and to exit at the opposite end. A condensor vapor 314 is condensed on the outside of the condensor tubes 300 as drops 316 of condensate. Drops 316 roll along the outside of the condensor tubes 300 until they reach the bottom edge of the tubes 300, from whence they fall onto the top of the next lower tubes 300, and repeat until they fall into a condensate accumulator 318 as accumulated liquid 320. The accumulated liquid 320 is pressurized by condensate pump 322 and a portion is transported by a condensor washing fluid supply tube 324 to a washing fluid distribution tube with nozzles 326 for spraying washing fluid onto the condensor tubes 300. The remaining portion of the pressurized, accumulated liquid 320 is transported out of the condensor housing 310 through a condensor housing port 328 as product condensate. Lateral support bars 330 support the condensor tubes 300 as needed along their length. Distribution tube support 332 extend from the top of the housing 310 to the washing fluid distribution tube 326 for support.

Figure 18:
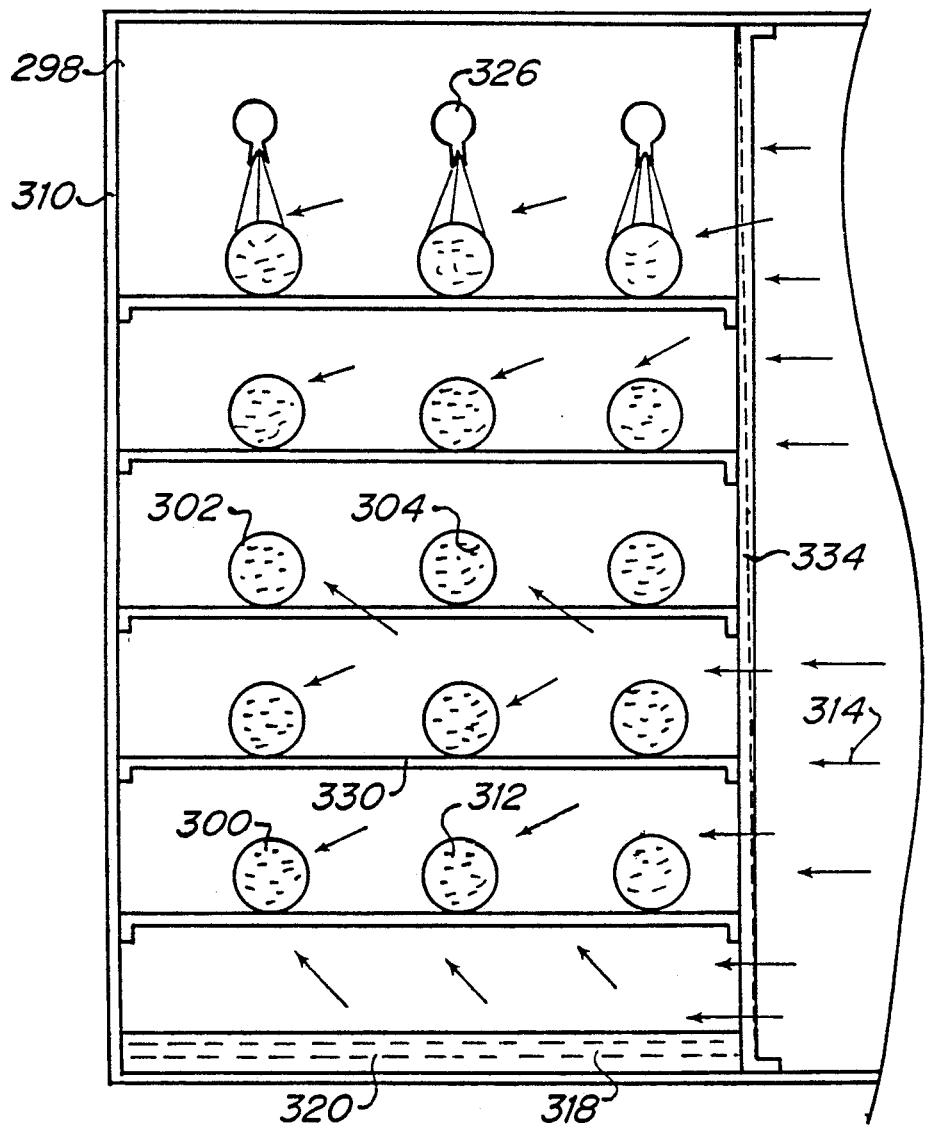
FIG. 18 is a side-elevational view of the tube of FIG. 17.

Referring now to FIG. 18, there is shown a cross section of the condensor 298 of FIG. 17, and shows how lateral support bars 330 are fastened to the side wall of the housing 310 on one end and extend to and are fastened to a vertical support bar 334 at the opposite end. The vertical support bar 334 is fastened to and extends from the bottom of the housing 310 to the top of the housing 310, to which it is fastened.

Figure 19:
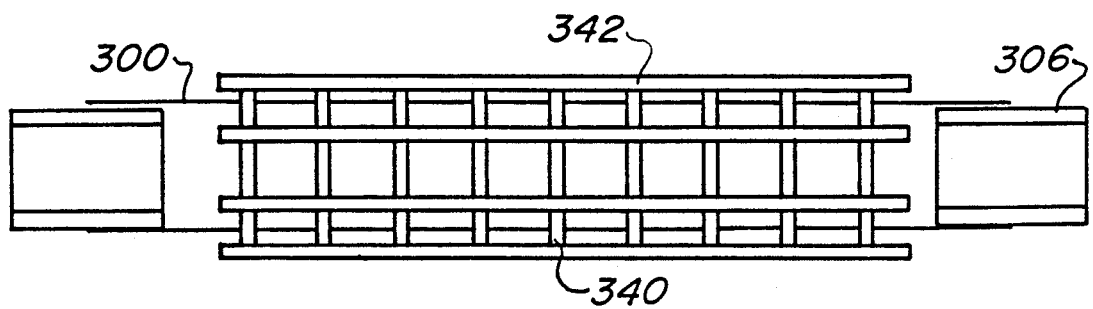
FIG. 19 is a view of a portion of the tube of FIG. 17.

It is possible that the pressure of cooling liquid 312 flowing within the tubes 300 will be larger than the tubes 300 can adequately handle. In FIG. 19 there is shown a series of vertically-oriented support rings 340 which help support the surface of the condensor tubes 300 against expansion under internal pressure. A series of positioning rods 342 run perpendicular to the support rings 340 and the positioning rods 342 are joined to the support rings 340 along the outer circumference of the support rings 340 to reduce interference to the flow of drops 316 along their downward path and loss of heat exchange surface area which would occur with screen mesh pattern.

Referring now to FIG. 20, there is shown a flow chart of a process to condense a vapor on a condensing surface which has an inherent drop-wise flow. The condensing surface has a significant vertical component in its orientation to assure flow of condensate under the influence of gravity. Vapor to be condensed is introduced 400 into a condensor. The condensor may be within its own chamber, as illustrated in FIG. 1, or it may be a portion of a larger chamber such as is common with multi-stage flash stills where one portion of a large chamber comprises a flash chamber and another portion of the same chamber comprises a condensing chamber.

The vapor introduced into the condensor diffuses 402 within the chamber until it contacts a condensing surface of a heat exchanger. Heat is extracted from vapor at the condensing surface 404, causing the vapor to condense into condensate. The heat of condensation is transmitted through said heat exchanger 406 to a heat-yielding surface thermally coupled to the condensing surface. A cooling fluid passes over the heat-yielding surface in order to absorb the heat of condensation 408.

A washing fluid is supplied to the upper portion of the condensing surface 410. The washing fluid is typically of the same chemical composition as the condensate, but may also be of a different composition, such as a light oil immiscible with the condensate and of a different specific gravity, so that it may be readily separated from the condensate by floating above it in an accumulator. Sufficient quantity of washing fluid is applied to the condensing surface to induce the washing fluid to flow down the condensing surface, and thereby wash away drops of condensate while they are still too small to flow on their own (typically before they have reached one mil in diameter). The application of washing fluid may be by spraying or by a direct contact method such as wicking. The washing fluid flows down the condensing surface under the influence of gravity 412, picking up and combining with drops of condensate it contacts along the way. The combined drops of washing fluid and condensate are accumulated 414 from a lower portion of the condensing surface.

The condensate is extracted 416 from the accumulated combination. If the condensate and the washing fluid are of the same chemical composition, then the extraction is simply a matter of removing a portion of the accumulated combination for use as a product condensate. If the condensate and the washing fluid are of different chemical combinations and are immiscible liquids, as described above, then the combination is directed into a separation tank where the condensate is allowed to sink and said washing fluid is allowed to rise, and the condensate is extracted from the lower portion of the separation tank and the washing fluid is extracted from the upper portion of the separation tank. The condensate is removed from the condensor 418. Typically, the condensate will need to be pressurized by a pump which may be located inside or outside of the chamber, depending upon design preferences. The washing fluid is extracted from accumulated combination 420 in manner similar to extraction of the condensate from the accumulated combination 416, as described above.

The washing fluid extracted in 420 is pressurized with a washing fluid pump 422. If the washing fluid pump is of a fixed-displacement type such as a vane or piston pump, then such pump may also serve as a pump to pressurize the product condensate, and such pressurization should take place before the condensate is extracted from the washing fluid. This is particularly important in embodiments which utilize a constant-pressure tank to store washing fluid for periodic release, as described below, so that a malfunction in the valve mechanism discussed below will not result in excessive pressures building up in the tank or in the washing fluid pump. The pressurized washing fluid passes through and is regulated by a constant pressure valve 424, and the pressure-regulated washing fluid is stored in a constant-pressure tank 426. In an alternative embodiment, the pressurized washing fluid may flow directly into the tank, thereby bypassing the constant-pressure valve. The internal pressure of the storage tank is sensed 427 with a pressure sensor. If the pressure is within predetermined limits, operation proceeds by periodically emptying the constant-pressure tank 428 by opening a valve between the tank and the washing fluid applicator, as discussed at 410 above. Typically, such valve will be open for a predetermined interval of time, such as two or three seconds, and will be closed for another interval of time, such as thirty seconds to a minute. Periodic flow of washing fluid allows it to be sprayed with larger drops and greater force than if a continuous application is made and this may avoid interference between the path of spray and the flow of vapor at high velocity.

In an alternative embodiment of the present invention, the pressurized washing fluid bypasses the storage tank and is transported as previously disclosed herein directly from the constant pressure regulation 424 to the application of washing fluid 410. This embodiment may be preferred when condensate and washing fluid are commonly pressurized and either a direct-contact washing-fluid applicator is used, such as a wick, or if the design of condensor is such that the velocity of vapors near a washing fluid spray nozzle is not great enough to interfere with the path of spray of washing fluid. In yet another embodiment, the pressure regulation and the constant-pressure storage with periodic release are bypassed, and the washing fluid is transported directly to the washing fluid applicator, as previously disclosed herein. This embodiment may be preferred when a direct-contact washing-fluid applicator (such as a wick) is used, or if the design of the condensor is such that the velocity of vapors near a washing fluid spray nozzle is not great enough to interfere with the path of spray of washing fluid, and the condensate is extracted from the accumulated combination 416 before the washing fluid is pressurized 422.

If the pressure is not within predetermined limits 427, an alarm is activated 432 to indicate improper pressure in the storage tank, and such alarm may include acoustical, visual, or computer-alert forms of action. Also, the valve normally operated at 428 is opened 434 in order to release pressure from the storage tank. In addition, the power is turned off 436 to the washing-fluid pump and any other pumps in the system.

Figure 21:
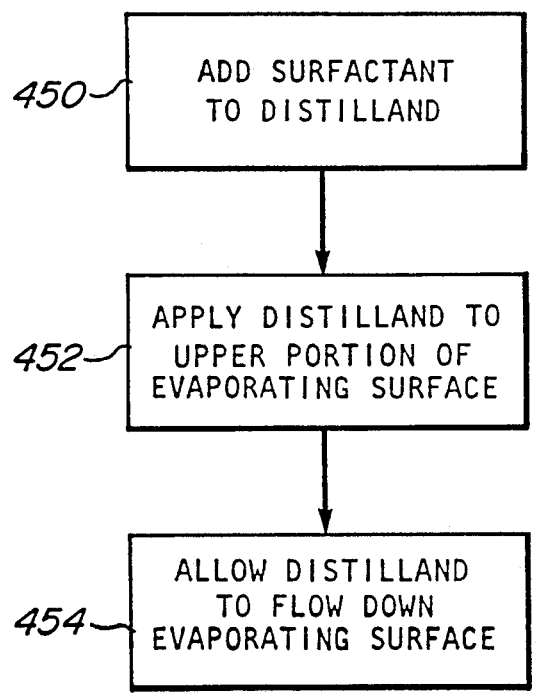
FIG. 21 is a flow-chart for adding and using a surfactant in a distilland.

Referring now to FIG. 21, there is shown a flow chart for a process to reduce the surface tension of a distilland in order to help it spread over an unwettable evaporating surface. The evaporating surface is oriented at least partially vertically, and since evaporating surface is unwettable by the distilland, the object is to establish a film-wise flow of distilland instead of allowing it to bead up into a drop-wise flow. Alternatively, the evaporating surface may be partially wettable by the distilland, in which case distilland will tend to bead hp if the film becomes too thin and the velocity of flow is too small. In this case, the objective is to maintain a film-wise flow over the evaporating surface while reducing the thickness of the film and reducing the velocity of flow over the evaporating surface. The effect of a thinner film and slower flow is that a higher percentage of distilland is vaporized in a single pass over the evaporating surface, thus reducing the number of passes needed to extract the desired quantity of vapor from the distilland. Ideally, with proper flow only a single pass will be needed, thus obviating pumping costs associated with recycling and multiple passes of the distilland over the evaporating surface.

Thus, a surfactant is added to the distilland 450. The exact ratio of surfactant to be added for a given quantity of distilland will vary depending on the chemical composition of the distilland, on the degree of wettability of distilland on the evaporating surface, and on the effect the particular surfactant has in increasing the wettability of the distilland on the evaporating surface. Numerous surfactants are known and are commercially available, including common low-suds laundry detergent as an acceptable surfactant for the distillation of brine. The surfactant should be as low-sudsing as possible in order to minimize any tendency for foaming which could result in unvaporized distilland being entrained in vapor and foam and carried to and contaminating a condensate elsewhere in a system. The surfactant-treated distilland is applied to an upper portion of the evaporating surface 452, and the surfactant-treated distilland is allowed to flow down the evaporating surface under the influence of gravity.

Figure 22:
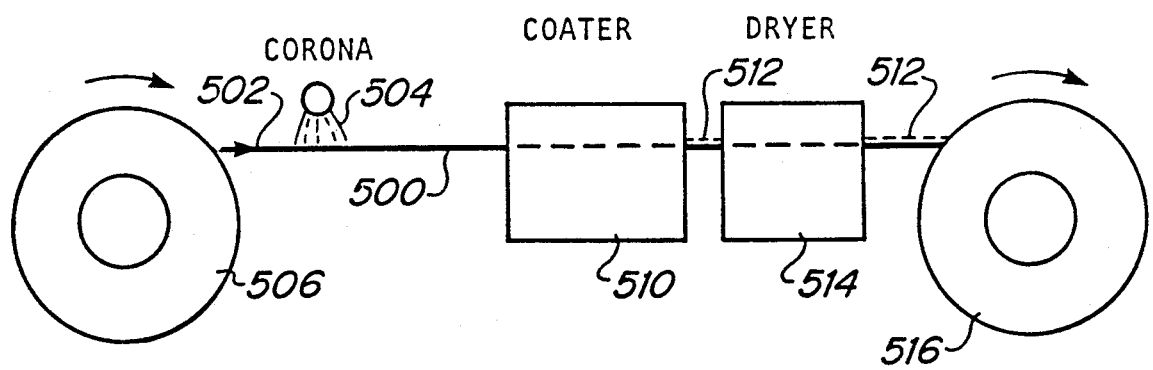
FIG. 22 is a pictorial diagram of apparatus for treating the surface of the tube of FIG. 17.

Referring now to FIG. 22, there is shown a pictorial diagram of apparatus for treating the evaporation surface of a polyethylene (or other plastic) membrane, including treating with surface-oriented corona discharge.

In FIG. 22 we show a diagrammatic view of apparatus to coat membrane material such as a plastic tube or film 500 in order to increase its wettability. The film or tube 500 for use in a still includes the upper or outer surface 502 which is to function as an evaporator surface. The film 500 proceeds from a supply spool 506 through a corona treatment station 508 at which a corona discharge 504 is applied to the surface 502. The film 500 then proceeds to coating module 510 in which a suitable coating 512 of a polymer such as neoprene or a mineral deposit such as calcium sulphate is placed on the surface 502. Where the coating 512 is a mineral deposit, it will be naturally quite brittle and must be kept as thin as possible in order to increase its flexibility while yet being thick enough to provide durability under operating conditions. The film 500 then proceeds to a dryer 514 which supplies hot air and infra-red heat to thoroughly dry the coating 512. Finally, the film 500 proceeds to a take-up spool 516 on which the coated membrane (tube or film) material is stored.

Where the membrane material 500 is a tube such that the interior of the tube functions as a condensing surface and the exterior functions as an evaporating surface, then the tube is flattened and the top and the bottom exterior portions of the tube may be treated in a combined single pass in which the upper and lower surfaces ar treated at each station substantially simultaneously. Alternatively, each of the upper and lower surfaces of the flattened tube may be treated separately during separate passes through single-side coating apparatus, as illustrated in FIG. 22.

I claim:

1. A method of condensing a vapor of a distilland on a surface of a membrane that includes a portion which is substantially vertically oriented and that is substantially unwettable by, and impervious to, the distilland, the method comprising the steps of:

supplying vapor of the distilland to the surface of the membrane;

transferring heat from the vapor at the surface of the membrane to condense droplets of the distilland thereon; and supplying droplets of a washing liquid to an upper portion of the surface of the membrane at substantially the same temperature as the condensed droplets of the distilland to promote the accumulation of condensed droplets of the distilland in response to gravity-induced downward flow of washing liquid and condensed droplets along the surface.

2. The method according to claim 1 wherein in the step of supplying, the droplets of washing liquid are intermittently sprayed onto the upper portion of the surface.

3. The method according to claim 1 comprising the additional steps of extracting one portion of the accumulated condensed droplets; and delivering to the upper portion of the surface another portion of the accumulated condensed droplets as the washing liquid.

4. The method according to claim 3 comprising the step of pressurizing the washing liquid for spraying onto the surface at intermittent intervals.

5. The method according to claim 1 wherein in the step of supplying a washing liquid, the washing liquid and the condensed droplets are of dissimilar chemical composition.

6. The method according to claim 5 wherein the step of supplying a washing liquid includes separating the washing liquid from the accumulated condensed droplets, and includes delivering the separated washing liquid to the upper portion of the surface.

7. A method of condensing a vapor of a distilland on a surface of a membrane that includes a portion which is substantially vertically oriented and that is substantially unwettable by, and impervious to, the distilland, the method comprising the steps of:

adding surfactant to the distilland of which vapor is to be condensed;

supplying the distilland and surfactant substantially as a continuous film on a surface of the membrane to receive heat transferred therethrough from an opposite surface of the membrane on which vapor of the distilland condenses;

supplying vapor of the distilland to the opposite surface of the membrane that is substantially unwettable;

transferring heat from the vapor at the opposite surface of the membrane to condense droplets of the distilland thereon; and supplying droplets of a washing liquid to an upper portion of the opposite surface of the membrane at substantially the same temperature as the condensed droplets of the distilland to promote the accumulation of condensed droplets of the distilland in response to gravity-induced downward flow of washing liquid and condensed droplets along the opposite surface.

* * * * *